(12) United States Patent
Lucas (10) Patent No.: US 6,175,413 B1
(45) Date of Patent: Jan. 16, 2001

(54) LASER CALIBRATION OF ROBOTICS SYSTEMS

(75) Inventor: Brian K. Lucas, Somerset (GB)

(73) Assignee: Proteus Corporation, Denver, CO (US)

( * ) Notice: Under 35 U.S.C. 154(b), the term of this patent shall be extended for 0 days.

(21) Appl. No.: 09/138,165

(22) Filed: Aug. 21, 1998

Related U.S. Application Data (60) Provisional application No. 60/057,805, filed on Aug. 28, 1997.

(51) Int. Cl.[7] .............................. G01B 11/14; G01B 21/00
(52) U.S. Cl. ............................................. 356/375; 73/1.79
(58) Field of Search ............................... 356/375; 73/1.79

(56) References Cited

U.S. PATENT DOCUMENTS

| 4,808,000 | 2/1989 | Pasciak . |
| 4,946,277 | 8/1990 | Marquet . |
| 5,198,876 | 3/1993 | Takashi . |
| 5,353,111 | 10/1994 | Freese . |

FOREIGN PATENT DOCUMENTS

| 0 304 307 A2 | 2/1989 | (EP) . |
| 0 747 719 A1 | 12/1996 | (EP) . |
| 2 601 443-A1 | 1/1988 | (FR) . |
| 2 669 257-A1 | 5/1992 | (FR) . |

| WO96/30171 | 10/1996 | (WO) . |

*Primary Examiner*—Richard A. Rosenberger
(74) *Attorney, Agent, or Firm*—Duft, Graziano & Forest, P.C.

(57) ABSTRACT

The invention is a system and method for calibrating a robotics system. The invention measures the actual performance of the robotics system when positioning objects at several calibration positions within an operational area. The invention then determines corrective factors based on the performance measurements. The robotics system uses the corrective factors to overcome positioning errors and operate in the field with extreme precision. The calibration system comprises a control system, a laser projection device, a plate, and a laser detection device. The robotics system positions the laser projection device to project a laser beam through a hole in the plate and onto a laser detection area on the laser detection device. The control system then directs the robotics system to move the laser projection device to a plurality of calibration positions. The laser detection device detects the laser beam on the laser detection surface when the laser beam is projected through the hole, and detects that the laser beam is not on the laser detection surface when the laser beam is projected onto the plate. The laser detection device provides information indicating the presence or absence of the laser beam to the control system. The control system determines a corrective factor for the robotics system based on the calibration positions and the information provided from the laser detection device.

22 Claims, 6 Drawing Sheets

LASER CALIBRATION OF ROBOTICS SYSTEMS

RELATED APPLICATIONS

This patent application is related to U.S. provisional patent application 60/057,805, entitled "Laser Calibration of Robotics Systems", and filed on Aug. 28, 1997.

BACKGROUND OF THE INVENTION

1. Field of the Invention

The invention is related to the field of robotics systems, and in particular, to the calibration of a robotics system by projecting a laser through the holes of a plate onto a laser detection surface from a plurality of calibration positions.

2. Statement of the Problem

Robotics systems are required to position objects relative to one another with extreme precision. In the field of complex circuitry testing, robotics systems must be able to position test probes within 0.001 of an inch of a point on a printed circuit board. Robotics systems are comprised of mechanical components, electrical components, and software components. These components each operate within individual tolerances that result in errors. The errors combine to degrade overall system performance when positioning objects. The robotics system can be designed so the combination of errors does not exceed the overall system tolerance, but this design technique is a complex undertaking. The resulting robotics system generally operates somewhere under the tolerance, but the actual accuracy of the robotics system is not measured and remains unknown.

An operational robotics system is difficult to calibrate when the robotics system fails to meet the overall system tolerance. System failure often results from a complex combination of non-linear errors. For example, software components round numerical values. Servo control electronics have imperfect response characteristics at various frequencies. Mechanical components lose performance when extended to more distant operating areas. Together, the combination of these errors is difficult to analyze and control when attempting to bring an entire robotics system within an overall system tolerance.

Prior techniques for calibrating a robotics system fail to measure the precision performance of the robotics system when it actually positions objects in an operational area. These systems also fail to generate corrective factors to correct repeated positioning errors. The systems also fail to incorporate the correction factors into the robotics system to improve precision performance in the field.

SUMMARY OF THE SOLUTION

The invention overcomes the problems discussed above by providing a system and method for calibrating a robotics system. The invention measures the actual performance of the robotics system when positioning objects at several calibration positions within an operational area. The invention then determines corrective factors based on the performance measurements. The robotics system uses the corrective factors to overcome positioning errors and operate in the filed with the extreme precision.

The calibration system comprises a control system, a laser projection device, a plate, and a laser detection device. The robotics system initially positions the laser projection device to project a laser beam through a hole in the plate and onto a laser detection area on the laser detection device. The control system then directs the robotics system to move the laser projection device to a plurality of calibration positions. At a first group of the calibration positions, the laser projection device projects the laser beam through the hole and onto the laser detection surface. At a second group of calibration positions, the laser projection device projects the laser beam onto the plate and not through the hole. The laser detection device detects the laser beam on the laser detection surface when the laser beam is projected through the hole, and detects that the laser beam is not on the laser detection surface when the laser beam is projected onto the plate. The laser detection device provides information indicating the presence or absence of the laser beam to the control system. The control system determines a corrective factor for the robotics system based on the calibration positions and the information provided from the laser detection device.

The calibration technique can be repeated for a grid of holes and at a variety of distances above the holes. As a result, the invention generates corrective factors for the robotics system over a large operational area. The corrective factors can be incorporated into the robotics system to provide precision positioning performance in the field.

DETAILED DESCRIPTION OF THE INVENTION

Figure 1:
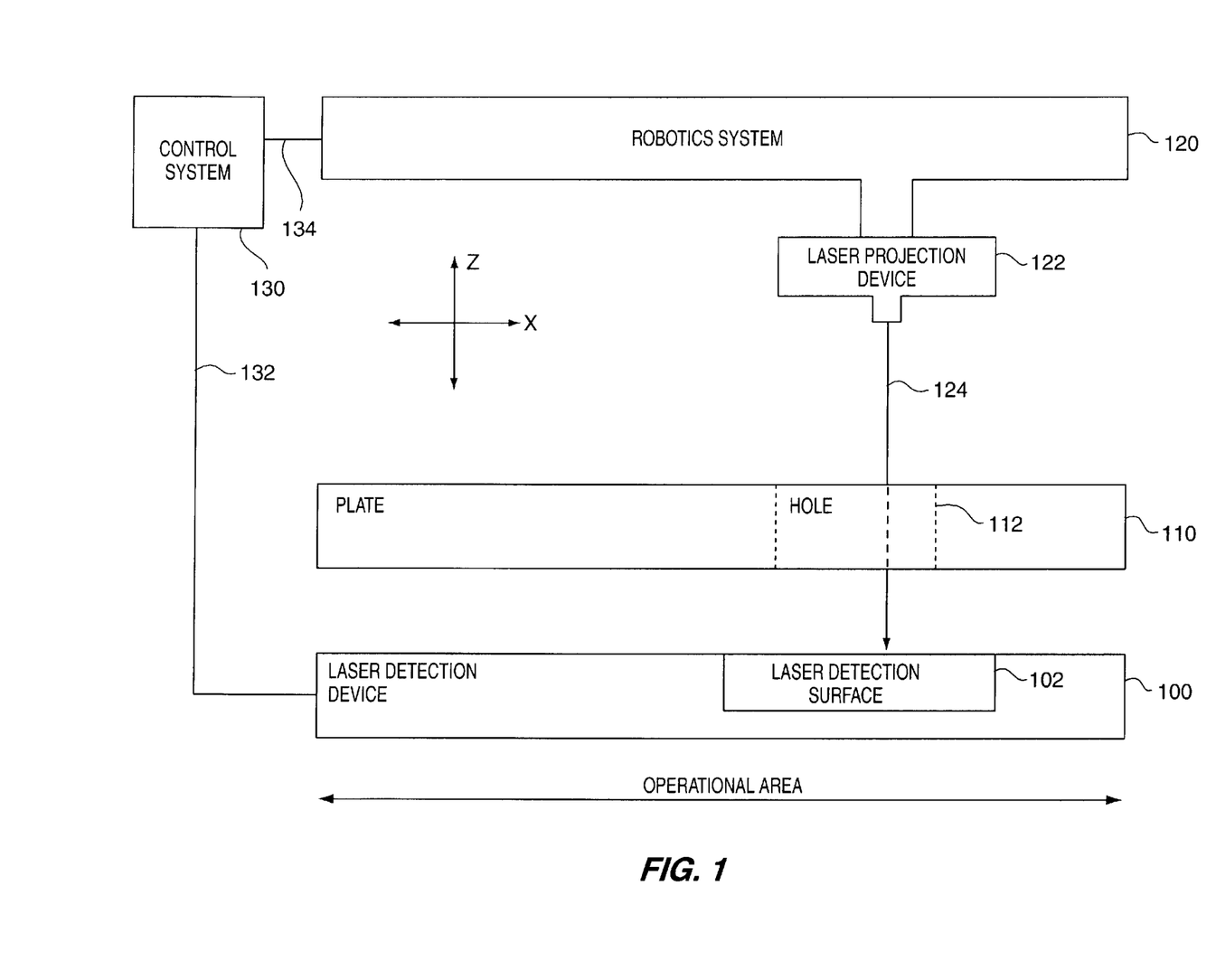
FIG. 1 is a block diagram of a calibration system configuration in a version of the invention.
Figure 2:
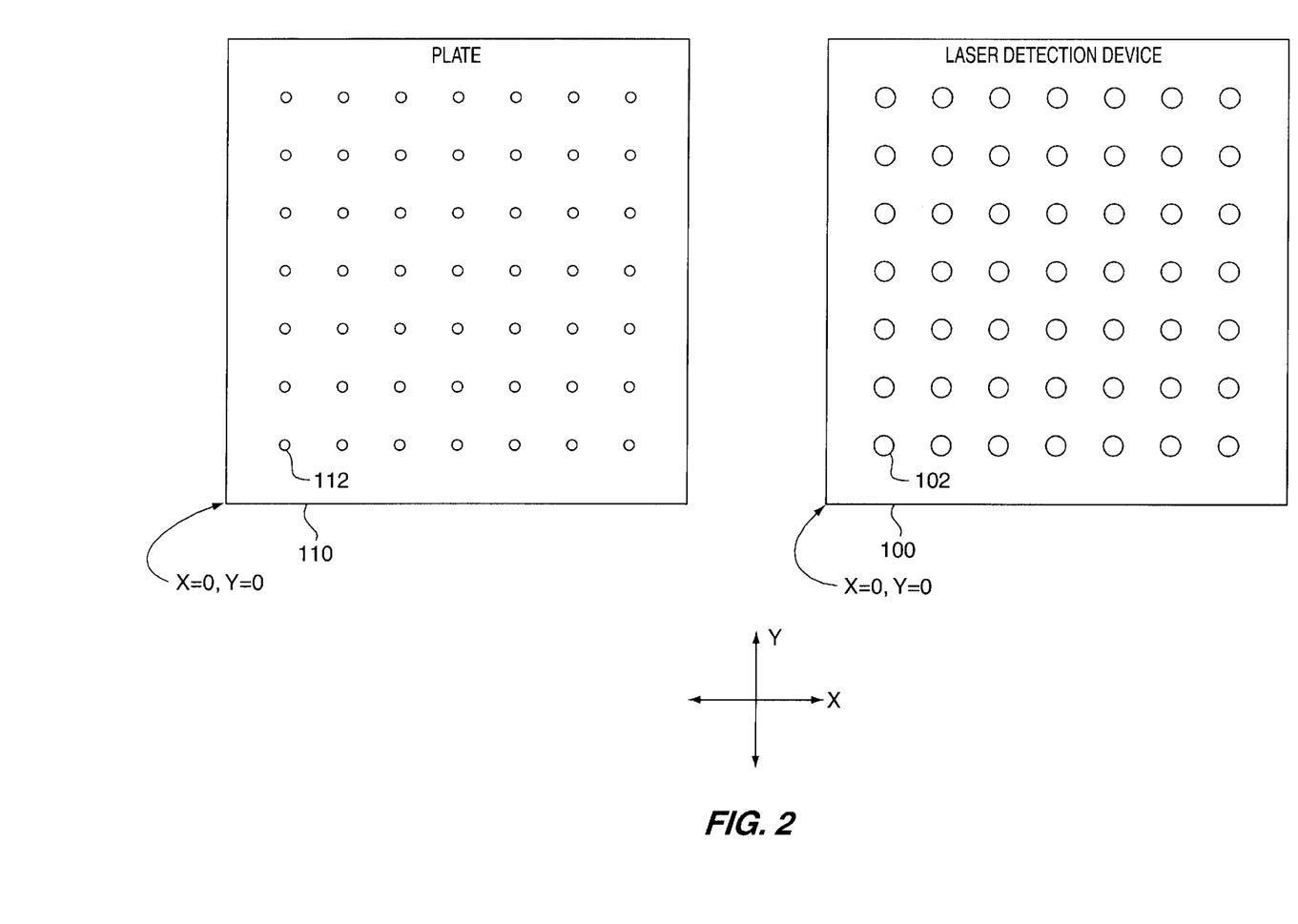
FIG. 2 is a block diagram of a laser detection device and a plate for a grid-based version of the invention.

Calibration System Configuration—FIGS. 1–2

FIG. 1 depicts a block diagram of a calibration system in the X–Z rectangular coordinate plane. The calibration system calibrates a robotics system 120 and comprises a laser detection device 100, a plate 110, a laser projection device 122, and a control system 130. The laser detection device 100 includes at least one laser detection surface 102.

The laser projection device 122 is coupled to the robotics system 120. The control system 130 is operationally coupled to the laser detection device 100 by a control link 132. The control system 130 is operationally coupled to the robotics system 120 by a control link 134.

The laser projection device 122 is operational to project a laser beam 124. The laser detection surface 102 is operational to detect the laser beam 124. The plate 110 includes at least one hole 112. The plate 110 is configured in parallel between the laser projection device 122 and the laser detection device 100, so that the laser beam 124 will be present on the laser detection surface 102 if the laser beam 124 passes through the hole 112 in a direction perpendicular to the plate 110. The laser detection device 100 spans an operational area.

The control system 130 is typically a computer configured to execute software in accord with the present invention. Those skilled the art will appreciate how to create the software and configure the computer based on this document. The control system 130 directs the robotics system 120 over the control link 134 to position the laser projection device 122 at a plurality of calibration positions that project the laser beam 124 toward the plate 110. The control system 130 obtains information from the laser detection device 100 over the control link 132 regarding the presence of the laser beam 124 on the laser detection surface 102 when the laser projection device 122 is positioned at the plurality of calibration positions. The control system 130 determines a corrective factor for the robotics system 120 based on the calibration positions and the information from the laser detection device 100.

In some examples of the invention, the laser detection surface 102 is a photo diode. The diameter of the photodiode is typically larger than the diameter of the hole 112. Additionally, the diameter of the hole 112 is typically larger than the diameter of the laser beam 124.

FIG. 2 depicts a specific example of the laser detection device 100 and the plate 110 in a grid-based calibration system. The invention is not restricted to this specific example, and those skilled in the art will appreciate variations that fall within the scope of the claims. The laser detection device 100 and the plate 110 are typically stacked as shown in FIG. 1, but they are shown side-by-side on FIG. 2 for comparative purposes. The laser detection device 100 and the plate 110 are shown in the X-Y rectangular coordinate plane with the Z direction going into the page. The perspective of FIG. 2 is viewed on FIG. 1 as looking from the laser projection device 122 in the Z-direction toward laser detection device 100 or the plate 110.

The laser detection device 100 comprises a plurality of laser detection surfaces, such as the laser detection surface 102. The laser detection surfaces form a grid with the point (X,Y)=(0,0) at lower left. The plate 110 includes a plurality of holes, such as the hole 112. The holes form a grid with the point (X,Y)=(0,0) at lower left. The points (X,Y)=(0,0) are actually the same point when these devices are stacked in operation. Each one of the holes is associated with a unique one of the laser detection surfaces. In some examples of the invention, the grid formed by the holes matches the X-Y coordinate system of the robotics system 120 or a printed circuit board.

When the plate 110 is positioned over the laser detection device 100 as shown in FIG. 1, the holes in the plate 110 are aligned over the laser detection surfaces on the later detection device 100. For example the hole 112 is positioned over the laser detection surface 102. In the grid-based calibration system, the laser beam 124 will be present on one of the laser detection surfaces if the laser beam 124 passes through one of the holes in a direction perpendicular to the plate 110. The laser detection device 100 is operational to provide an electrical signal to the control link 132 that indicates the unique one of the laser detection surfaces that detects the presence of the laser beam 124.

Calibration System Operation—FIGS. 3–6

Figure 3:
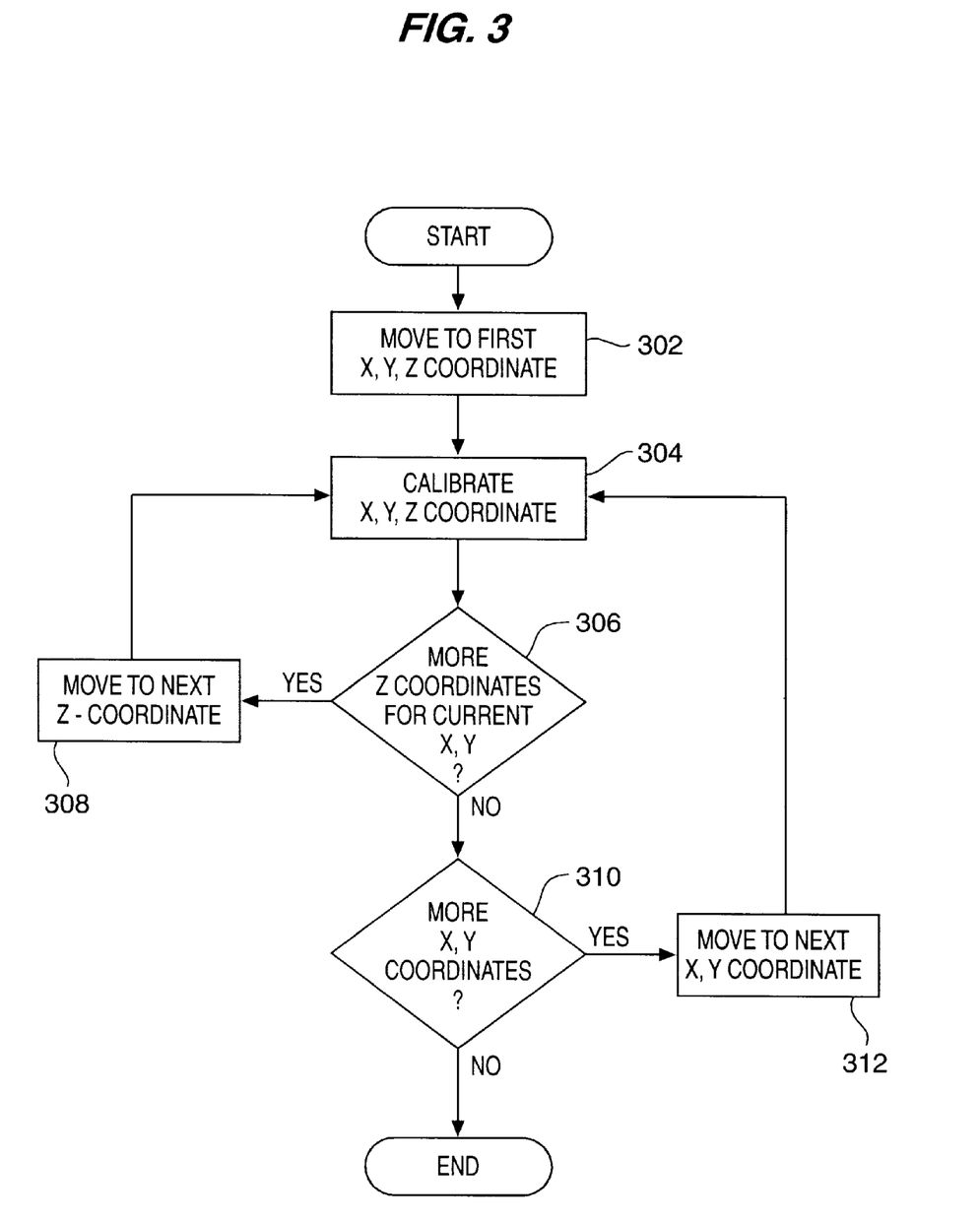
FIG. 3 is flow diagram depicting calibration logic in a version of the invention.

FIGS. 3–6 depicts a specific example of the operation of a grid-based calibration system. The invention is not restricted to this specific example, and those skilled in the art will appreciate variations that fall within the scope of the claims. FIG. 3 depicts the overall operation of the calibration system and starts at step 302 when the control system 130 causes the robotic system 120 to move the laser projection device 122 to the first (X,Y,Z) coordinate. The calibration system performs a calibration routine at the (X,Y,Z) coordinate in step 304. After the calibration routine is performed, the control system 130 checks for additional Z-coordinates for the X-Y coordinates in step 306. If there are additional Z-coordinates, the control system 130 causes the robotic system 120 to move the laser projection device 122 to the next Z coordinate in step 308. The calibration system performs the calibration routine at this next (X,Y,Z) coordinate in step 304. This can be viewed on FIG. 1 as vertically moving the laser projection device 122 to calibrate at various points.

When there are no more Z coordinates for the current X-Y coordinate in step 306, the control system 130 checks for additional X-Y coordinates in step 310. If there are additional X-Y coordinates, the control system 130 causes the robotic system 120 to move the laser projection device 122 to the next X-Y coordinate in step 312. This can be viewed on FIG. 1 as horizontally moving the laser projection device 122 to calibrate at various points. The process returns to steps 304, 306, and 308 to perform calibration routines at various Z coordinates, and then checks for additional X-Y coordinates at step 310. The process ends when there are no more X-Y coordinates in step 310.

Figure 4:
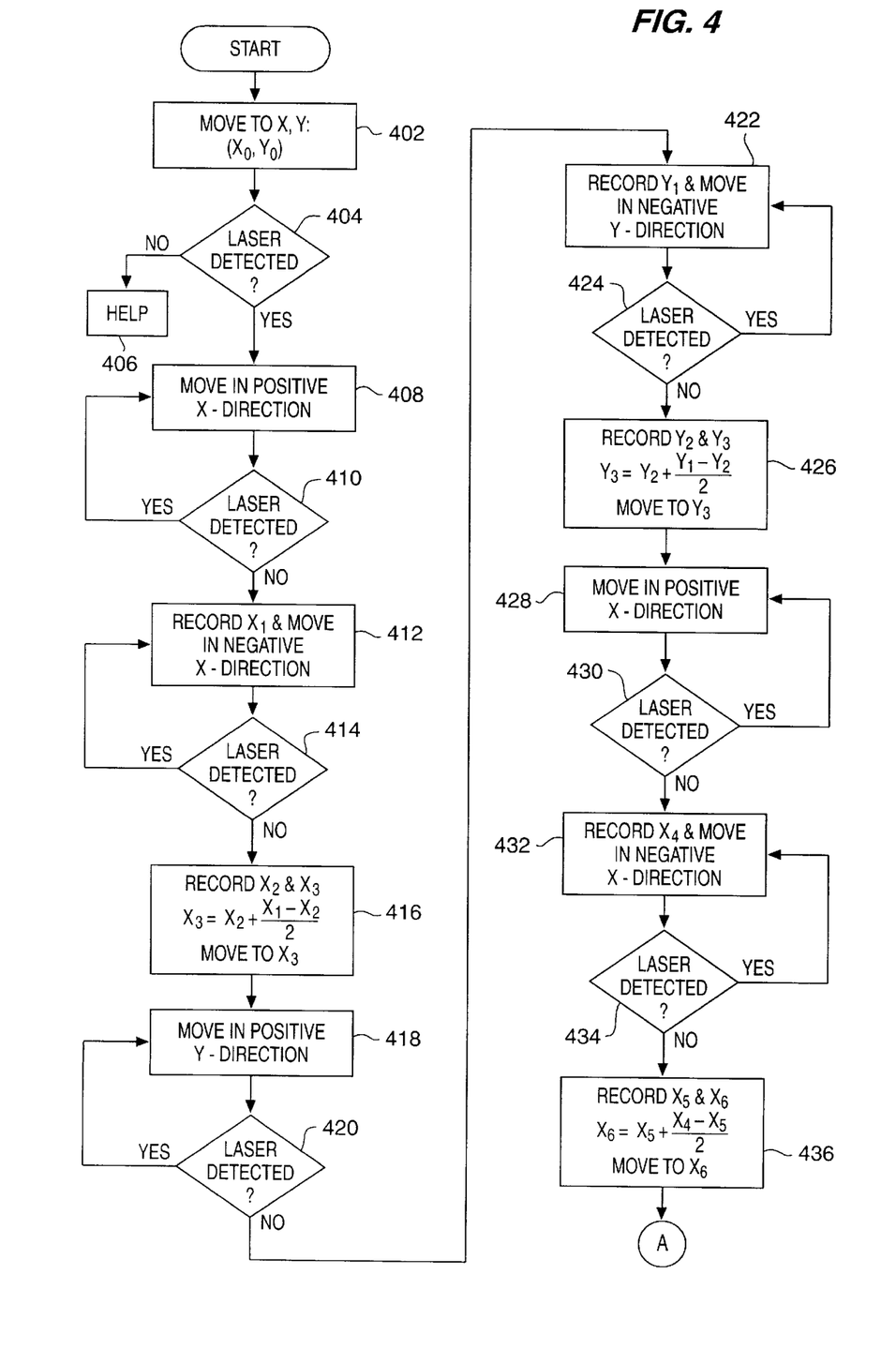
FIG. 4 is flow diagram depicting calibration logic in a version of the invention.
Figure 5:
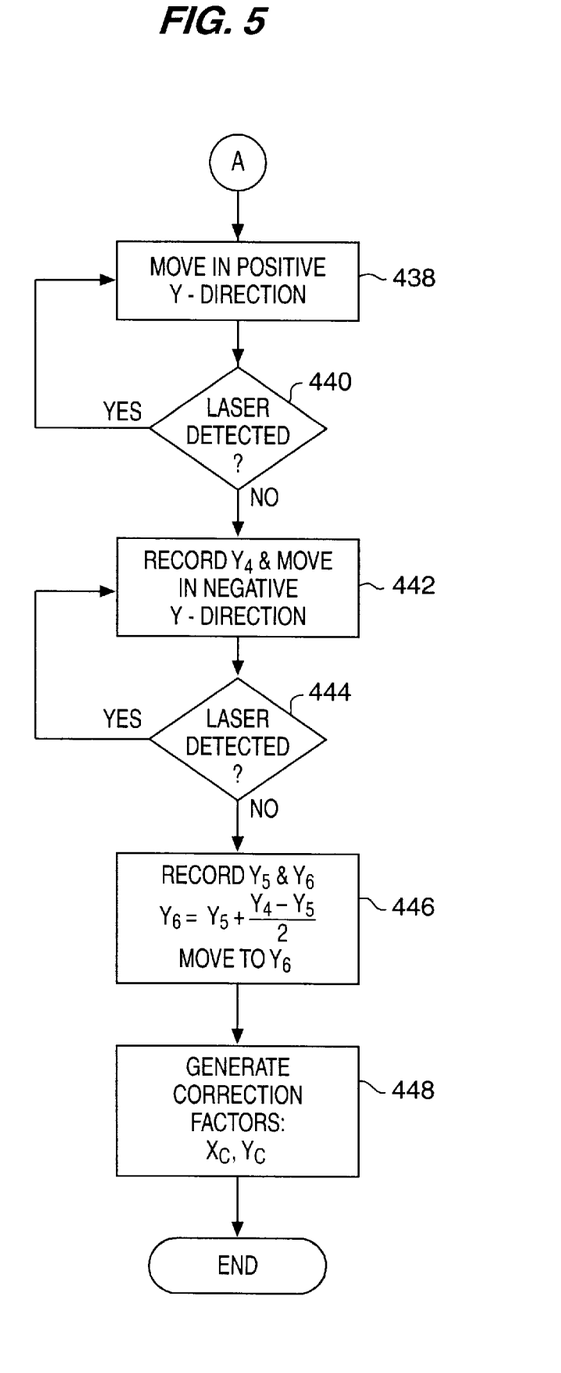
FIG. 5 is flow diagram depicting calibration logic in a version of the invention.
Figure 6:
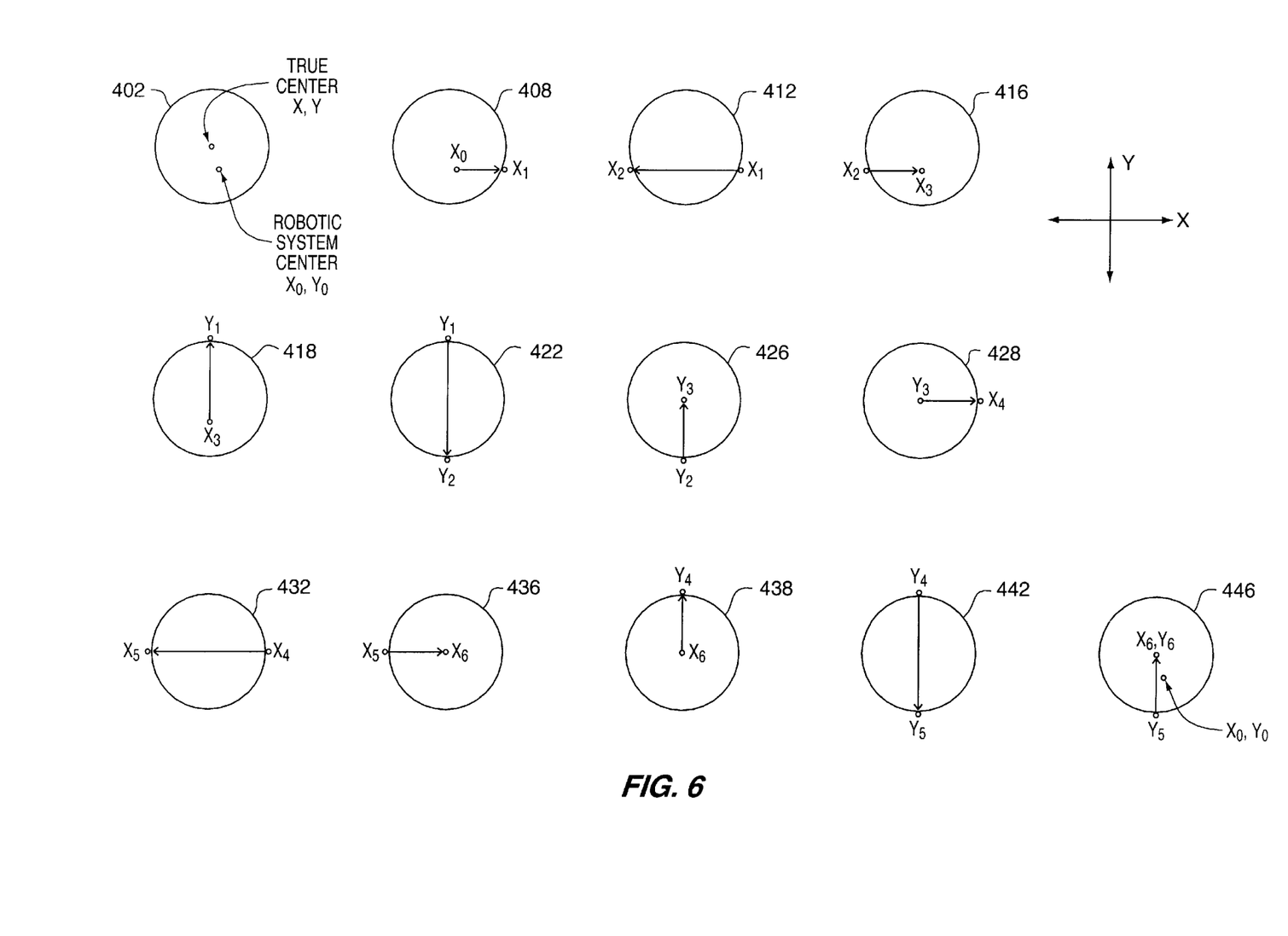
FIG. 6 illustrates views of calibration positions in a version of the invention.

FIGS. 4–6 depict the calibration routine. FIGS. 4–5 are referenced by the term "step" and depict the logic of the calibration routine. FIG. 6 is referenced by the term "view" and depicts views of the various (X,Y) points referred to in FIGS. 4–5. FIG. 6 depicts the above view of the laser beam and hole during the calibration process. The reference numbers for the steps and views coincide, so view 402 on FIG. 6 corresponds to step 402 on FIG. 4.

The calibration routine is based on repeatedly moving the laser beam across the hole until the laser beam is blocked by the plate and no longer detected by the laser detection surface below. The combination of movement and detection measures the hole so a true center for the hole can be determined. An attempt by the robotics system to locate the center is compared to the measured center to determine a correction factor for the robotics system at that point in the operational area. The calibration process is then repeated for several points in the operational area to create a set of a correction factors for robotics system across the entire three-dimensional operational area. Using the set of correction factors, the robotics system is able to position objects with extreme precision throughout the operational area.

The process starts in step/view 402 when the control system 130 causes the robotics system 120 to attempt to move the laser projection device 122 to an X-Y coordinate at the center of a hole in the plate 110. Due to errors, the robotics system 120 actually moves the laser projection device 122 to an initial point (X0, Y0) that is off-center. If the laser is not detected in step 404, then a help signal is generated in step 406.

If the laser is detected in step 404, then the laser is moved into the positive X-direction in step/view 408 to the point X1 where the laser is no longer detected in step 410. The point X1 is recorded. The laser is moved in the negative X-direction in step/view 412 to the point X2 where the laser is no longer detected in step 414. The points X2 and X3 are recorded where X3=X2+((X1−X2)/2). The laser is moved in the positive X-direction in step/view 416 to the point X3. X3 represents the rough center of the hole along the X axis.

The laser is moved into positive Y-direction in step/view 418 to the point Y1 where the laser is no longer detected in step 420. The point Y1 is recorded. The laser is moved in the negative Y-direction in step/view 422 to the point Y2 where the laser is no longer detected in step 424. The points Y2 and Y3 are recorded where Y3=Y2+((Y1−Y2)/2). The laser is moved in the positive Y-direction in step/view 426 to the point Y3. Y3 represents the rough center of the hole along the Y axis.

The laser is moved into positive X-direction in step/view 428 to the point X4 where the laser is no longer detected in step 430. The point X4 is recorded. The laser is moved in the negative X-direction in step/view 432 to the point X5 where the laser is no longer detected in step 434. The points X5 and X6 are recorded where X6=X5+((X4−X5)/2). The laser is moved in the positive X-direction in step/view 436 to the point X6.

On FIG. 5, the laser is moved into positive Y-direction in step/view 438 to the point Y4 where the laser is no longer detected in step 440. The point Y4 is recorded. The laser is moved in the negative Y-direction in step/view 442 to the point Y5 where the laser is no longer detected in step 444. The points Y5 and Y6 are recorded where Y6=Y5+((Y4−Y5)/2). The laser is moved in the positive Y-direction in step/view 446 to the point (X6,Y6). The point (X6,Y6) represents the true center of the hole.

In step 448, the correction factors (Xc,Yc) are generated based on the difference between the initial attempt at the center point (X0,Y0) and the true center point (X6,Y6). The difference can be found by combining the actual distances moved between (X0,Y0) and (X6,Y6). Xc=(distance from X0 to X1)−(distance from X1 to X2)+(distance from X2 to X3)+(distance from X3 to X4)−(distance from X4 to X5)+(distance from X5 to X6). Yc=(distance from Y0 to Y1)−(distance from Y1 to Y2)+(distance from YX2 to Y3)+(distance from Y3 to Y4)−(distance from Y4 to Y5)+(distance from Y5 to Y6). Effectively, Xc=X6−X0, and Yc=Y6−Y0.

The calibration process is typically repeated for various (X,Y,Z) coordinates within the operational area to generate a set of correction factors that are applied based on the position of the robotics system 120 within the operational area. Thus, the calibration system improves the precision operation of the robotics system 120 throughout the entire operational area. Advantageously, the robotics system 120 operates in the field with extreme precision.

Those skilled in the art will appreciate variations of the above-described embodiments that fall within the scope of the invention. As a result, the invention is not limited to the specific examples and illustrations discussed above, but only by the following claims and their equivalents.

What is claimed is:

1. A calibration system for calibrating a robotics system, wherein the calibration system comprises:
   a laser detection device that has at least one laser detection surface and wherein the laser detection device is operational to determine a presence of a laser beam on the laser detection surface;
   a plate that has at least one hole wherein the plate is coupled in parallel to the laser detection device so the laser beam will be present on the laser detection surface if the laser beam passes through the hole in a direction perpendicular to the plate and toward the laser detection surface;
   a laser projection device that is operational to project the laser beam and that is operational to be coupled to the robotics system; and
   a control means for directing the robotics system to position the laser projection device at a plurality of calibration positions that project the laser beam toward the plate, for obtaining information from the laser detection device regarding the presence of the laser beam on the laser detection surface when the laser projection device is positioned at the plurality of calibration positions, and for determining a corrective factor for the robotics system based on the calibration positions and the information from the laser detection device.

2. The system of claim 1 wherein the laser detection surface is a photo diode.

3. The system of claim 2 wherein a diameter of the photodiode is larger than a diameter of the hole.

4. The system of claim 3 wherein the diameter of the hole is larger than a diameter of the laser beam.

5. The system of claim 1 wherein the laser detection device has a plurality of laser detection surfaces that form a laser detection grid.

6. The system of claim 5 wherein the plate has a plurality of holes that form a plate grid.

7. The system of claim 6 wherein the plate grid is aligned with the laser detection grid so the laser beam will be present on one of the laser detection surfaces if the laser beam passes through one of the holes in a direction perpendicular to the plate grid and toward the laser detection grid.

8. The system of claim 6 wherein each one of the holes is associated with a unique one of the laser detection surfaces and the laser detection device is operational to provide an electrical signal that indicates the unique one of the laser detection surfaces that detects the presence of the laser beam.

9. The system of claim 6 wherein the grid formed by the holes matches an X-Y coordinate system of the robotics system.

10. The system of claim 6 wherein the grid formed by the holes matches an X-Y coordinate system of a printed circuit board.

11. A method for calibrating a robotics system, wherein the calibration system comprises a control system, a laser projection device, a laser detection device that has at least one laser detection surface, and a plate that has at least one hole, wherein the laser detection surface and the plate are positioned in parallel, the method comprising:
   (a) in the control system, directing the robotics system to position a laser projection device at a plurality of calibration positions;
   (b) in the laser projection device, projecting a laser beam through the hole in the plate and onto the laser detection surface at a first group of the calibration positions, and projecting the laser beam onto the plate and not through the hole at a second group of calibration positions;
   (c) in the laser detection device, detecting the laser beam on the laser detection surface when the laser beam is projected through the hole onto the laser detection surface, detecting that the laser beam is not on the laser detection surface when the laser beam is projected onto the plate and not through the hole, and providing information indicating presence and absence of the laser beam to the control system; and
   (d) in the control system, determining a corrective factor for the robotics system based on the calibration positions and the information provided from the laser detection device.

12. The method of claim 11 further comprising repeating steps (a) through (d) for a plurality of holes.

13. The method of claim 11 further comprising repeating steps (a) through (d) with the laser projection device at a plurality of distances from the plate.

14. The method of claim 11 further comprising incorporating the corrective factor into the robotics system.

15. A method for calibrating a robotics system, wherein the calibration system comprises a laser detection device that has at least one laser detection surface and a plate that has at least one hole, wherein the laser detection surface and the plate lie in parallel X-Y planes the method comprising:

(a) directing the robotics system to position a laser projection device to project a laser beam in a Z-direction to a center X-coordinate and a center Y-coordinate, wherein the center X-coordinate and a center Y-coordinate represent a center of the hole, and wherein the laser beam is projected through the hole onto the laser detection surface;

(b) directing the robotics system to move the laser projection device in a positive X-direction;

(c) identifying a first X-coordinate when the laser detection surface no longer detects the laser beam because the laser beam is blocked by the plate;

(d) directing the robotics system to move the laser projection device in a negative X-direction;

(e) identifying a second X-coordinate when the laser detection surface no longer detects the laser beam because the laser beam is blocked by the plate;

(f) determining a third X-coordinate that is in between the first X-coordinate and the second X-coordinate and equidistant from the first X-coordinate and the second X-coordinate;

(g) directing the robotics system to position the laser projection device to project the laser beam to the third X-coordinate (h) directing the robotics system to move the laser projection device in a positive Y-direction;

(i) identifying a first Y-coordinate when the laser detection surface no longer detects the laser beam because the laser beam is blocked by the plate;

(j) directing the robotics system to move the laser projection device in a negative Y-direction;

(k) identifying a second Y-coordinate when the laser detection surface no longer detects the laser beam because the laser beam is blocked by the plate;

(l) determining a third Y-coordinate that is in between the first Y-coordinate and the second Y-coordinate and equidistant from the first Y-coordinate and the second Y-coordinate;

(m) identifying the third X-coordinate and the third Y-coordinate; and determining a corrective factor for the robotics system using a sixth X-coordinate and a sixth Y-coordinate.

16. The method of claim 15 further comprising:

(n) directing the robotics system to position the laser projection device to project the laser beam to the third X-coordinate and the third Y-coordinate;

(o) directing the robotics system to move the laser projection device in the positive X-direction;

(p) identifying a fourth X-coordinate when the laser detection surface no longer detects the laser beam because the laser beam is blocked by the plate;

(q) directing the robotics system to move the laser projection device in the negative X-direction;

(r) identifying a the fifth X-coordinate when the laser detection surface no longer detects the laser beam because the laser beam is blocked by the plate;

(s) determining the sixth X-coordinate that is in between the fourth X-coordinate and the fifth X-coordinate and equidistant from the fourth X-coordinate and the fifth X-coordinate;

(t) directing the robotics system to position the laser projection device to project the laser beam to the sixth X-coordinate (u) directing the robotics system to move the laser projection device in the positive Y-direction;

(v) identifying a fourth Y-coordinate when the laser detection surface no longer detects the laser beam because the laser beam is blocked by the plate;

(w) directing the robotics system to move the laser projection device in the negative Y-direction;

(x) identifying a fifth Y-coordinate when the laser detection surface no longer detects the laser beam because the laser beam is blocked by the plate;

(y) determining the sixth Y-coordinate that is in between the fourth Y-coordinate and the fifth Y-coordinate and equidistant from the fourth Y-coordinate and the fifth Y-coordinate; and (z) identifying the sixth X-coordinate and the sixth Y-coordinate.

17. The method of claim 16 further comprising directing the robotics system to position the laser projection device at a plurality of Z-coordinates and repeating steps (a) through (z) for each Z-coordinate.

18. The method of claim 17 further comprising determining a corrective factor for each Z-coordinate.

19. The method of claim 16 further comprising:

directing the robotics to project the laser beam to plurality of other center X-coordinates and other center Y-coordinates, wherein the other center X-coordinates and the other center Y-coordinates represent other centers of other holes; and repeating steps (a) through (z) for every other center X-coordinate and other center Y-coordinate.

20. The method of claim 19 further comprising determining a corrective factor for every other center X-coordinate and other center Y-coordinate.

21. The method of claim 20 further comprising storing each corrective factor in the robotics system.

22. The method of claim 15 further comprising storing the corrective factor in the robotics system.

* * * * *